United States Patent [19]
Graf et al.

[11] Patent Number: 5,547,043
[45] Date of Patent: Aug. 20, 1996

[54] ELECTROCHEMICALLY REACTIVE ELEMENT FOR LUBRICANT DISPENSER

[75] Inventors: Walter Graf, Euerdorf; Ulrich Immisch, Bad Kissingen, both of Germany

[73] Assignee: Satzinger GmbH & Co., Euerdorf, Germany

[21] Appl. No.: 422,589

[22] Filed: Apr. 14, 1995

[30] Foreign Application Priority Data

Apr. 27, 1994 [DE] Germany ............... 44 14 672.8

[51] Int. Cl.$^6$ ........................................... F16N 5/00
[52] U.S. Cl. ..................... 184/39; 184/109; 204/278
[58] Field of Search ..................... 184/29, 39, 40, 184/41, 42; 204/148, 248, 278

[56] References Cited

U.S. PATENT DOCUMENTS

| | | | |
|---|---|---|---|
| 3,430,731 | 3/1969 | Satzinger | 184/39 |
| 3,983,959 | 10/1976 | Satzinger | 184/39 |
| 4,664,761 | 5/1987 | Zupanic et al. | 204/278 |
| 4,980,037 | 12/1990 | Hossain et al. | 204/278 |
| 5,012,897 | 5/1991 | Jorissen | 184/29 |
| 5,409,084 | 4/1995 | Graf | 184/39 |

FOREIGN PATENT DOCUMENTS

| | | | |
|---|---|---|---|
| 0209926 | 1/1987 | European Pat. Off. | 184/39 |
| 1256001 | 12/1967 | Germany . | |
| 3811469 | 10/1989 | Germany | 184/39 |
| 4414672 | 6/1995 | Germany . | |

OTHER PUBLICATIONS

Bargel/Schulze Werkstoffkunde Mit 599 Zeichnungen, 104, Fotos, 73 Tabellen 2., berichtigte Auflage 1980, p. 808 and pp. 74 and 75 dated Dec. 1978.

*Primary Examiner*—Thomas E. Denion
*Attorney, Agent, or Firm*—Herbert Dubno; Andrew Wilford

[57] ABSTRACT

A lubricant dispenser has a housing, a piston subdividing the housing into a pair of compartments one of which is generally closed and the other of which is adapted to be connected to a machine to be lubricated, a body of a reactive liquid in the one closed compartment, and a body of a fluent lubricant in the other compartment. The piston is movable against the lubricant body to force same from the housing to the machine. A reactive element in the one compartment can react with the liquid and form a gas when immersed in the reactive liquid to push the piston with the gas against the lubricant body and expel the lubricant from the housing. The reactive element is constituted as a coherent block by a multiplicity of particles of an active substance capable of reacting with the liquid and forming a gas on reaction therewith and a multiplicity of particles intermixed and in electrically conductive engagement with the active particles of a substance that is substantially less reactive.

7 Claims, 2 Drawing Sheets

5,547,043

ELECTROCHEMICALLY REACTIVE ELEMENT FOR LUBRICANT DISPENSER

FIELD OF THE INVENTION

The present invention relates to an automatic lubricant dispenser. More particularly this invention concerns an electrochemically reactive element for such a dispenser.

BACKGROUND OF THE INVENTION

It is known to provide a piece of machinery with an automatic lubricant dispenser that is pressurized to force a fluent lubricant, normally an oil or grease, along a conduit into a part, typically a bearing, of the machine. In order to avoid having to provide a pump it has been suggested to provide a gas-generating cell which pressurizes the lubricant by means of a chemical reaction that can be initiated by the user when the dispenser is connected to the machine, and that generates sufficient gas to deplete the entire supply of lubricant in the dispenser.

German patent document 3,811,469 filed Apr. 6, 1988 by B. Jorissen describes a system where the vessel containing the lubricant is fitted with a complete gas-generating cell comprising a compartment containing a reactive liquid and a cartridge defining a compartment containing an active-alloy metal that can react with the liquid to generate a gas. The cartridge is screwed into the cell to activate the chemical reaction and drive down a separate piston that is provided in the vessel. A similar system id described in German patent document 1,256,001 filed Jul. 21, 1964 by G. Satzinger as well as in U.S. Pat. Nos. 5,012,897 and 5,386,883, and U.S. patent application Ser. Nos. 08/156,564, 08/264,479, 08/276,084, and 08/303,353.

The reactive element for such a dispenser typically is formed as a part of two separate metals, one more active, that is higher in the electromotive series, than the other. In a standard system a plate or wafer of zinc is formed with a hole or recess in which is set or soldered a nickel-coated plug of molybdenum. When such an element is immersed in citric acid, hydrogen is generated.

While such an element works well, it often does not react as well as desired and is frequently difficult to manufacture.

OBJECTS OF THE INVENTION

It is therefore an object of the present invention to provide an improved reactive element for an automatic lubricant dispenser.

Another object is the provision of such an improved reactive element for an automatic lubricant dispenser which overcomes the above-given disadvantages, that is which reacts surely and uniformly and that can be manufactured easily.

SUMMARY OF THE INVENTION

A lubricant dispenser has according to the invention a housing, a piston subdividing the housing into a pair of compartments one of which is generally closed and the other of which is adapted to be connected to a machine to be lubricated, a body of a reactive liquid in the one closed compartment, and a body of a fluent lubricant in the other compartment. The piston is movable against the lubricant body to force same from the housing to the machine. An element in the one compartment can react with the liquid and form a gas when immersed in the reactive liquid to push the piston with the gas against the lubricant body and expel the lubricant from the housing. According to the invention the reactive element is constituted as a coherent block by a multiplicity of particles of an active substance capable of reacting with the liquid and forming a gas on reaction therewith and a multiplicity of particles intermixed and in electrically conductive engagement with the active particles of a substance that is less active, that is lower in the electromotive series.

The invention is based on the discovery that there is no need to constitute the substances of different electromotive activity as separate blocks of material that are joined together. Instead mixing particles of the two substances produces an element that is guaranteed to generate gas efficiently when immersed in a reactive liquid, normally an acid.

According to the invention the element is formed as a ball or tablet. It can be cast or constituted as an alloy of the two substances. This alloy can be heat treated to form large particles or grains that ensure long-term gas generation once the gas reaction has been started or the elements surface can be roughened to similarly control reaction speed. Alternately the particles can be sintered together to form the element or the element can have a conductive synthetic-resin matrix in which the particles are imbedded. It is even possible for the element to have a synthetic-resin matrix in which are imbedded grains each formed as an alloy of the substances.

The substances according to the invention can be zinc and copper, zinc and aluminum, or aluminum and copper. The more active substance forms an anode and the less active one the cathode and the substances and acid are selected to generate hydrogen.

BRIEF DESCRIPTION OF THE DRAWING

The above and other objects, features, and advantages will become more readily apparent from the following description, reference being made to the accompanying drawing in which.

SPECIFIC DESCRIPTION

Figure 4:
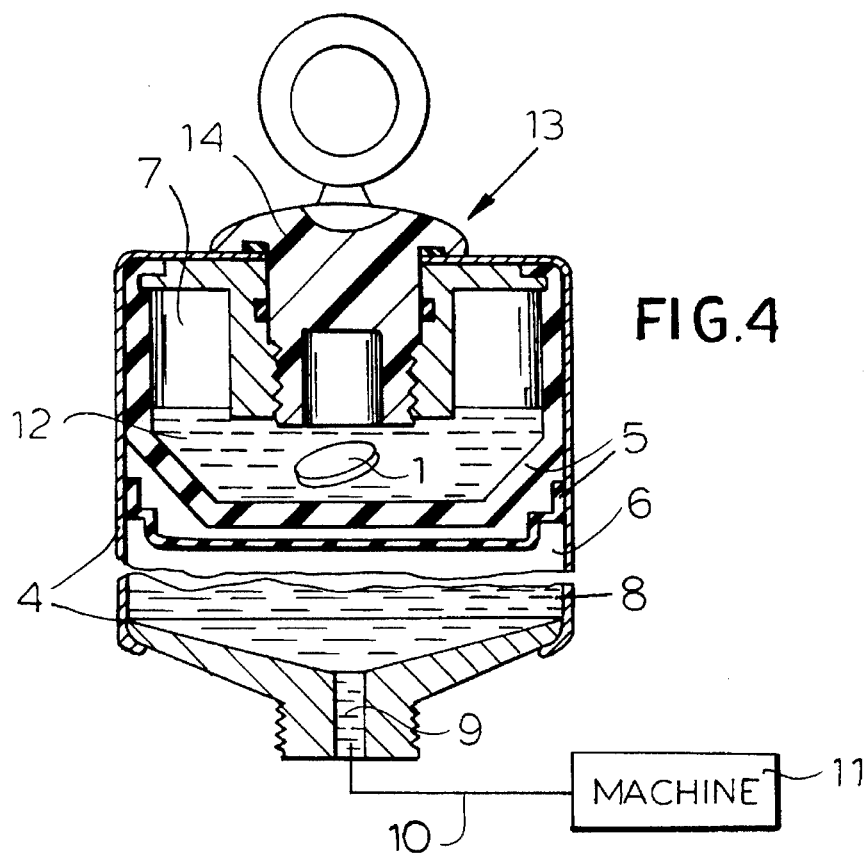
FIG. 4 is a partly diagrammatic small-scale view of a lubricant-dispenser system according to the invention.

As seen in FIG. 4 an automatic lubricant dispenser comprises a basically cylindrical housing 4 of cylindrical shape subdivided internally by a piston 5 into a lower compartment 6 and an upper compartment 7. The lower compartment 6 holds a body 8 of lubricant, typically grease or oil, that can be fed via an outlet hole 9 and a conduit 10 to a machine 11 to be lubricated. The upper compartment 7 holds a body 12 of a reactive liquid, normally an acid, and a cartridge 13 holding the element 1 and provided with a threaded plug 14 that can be screwed in to force the element 1 through an unillustrated partition so it can be immersed in the acid body 12. This structure is standard.

Figure 1:
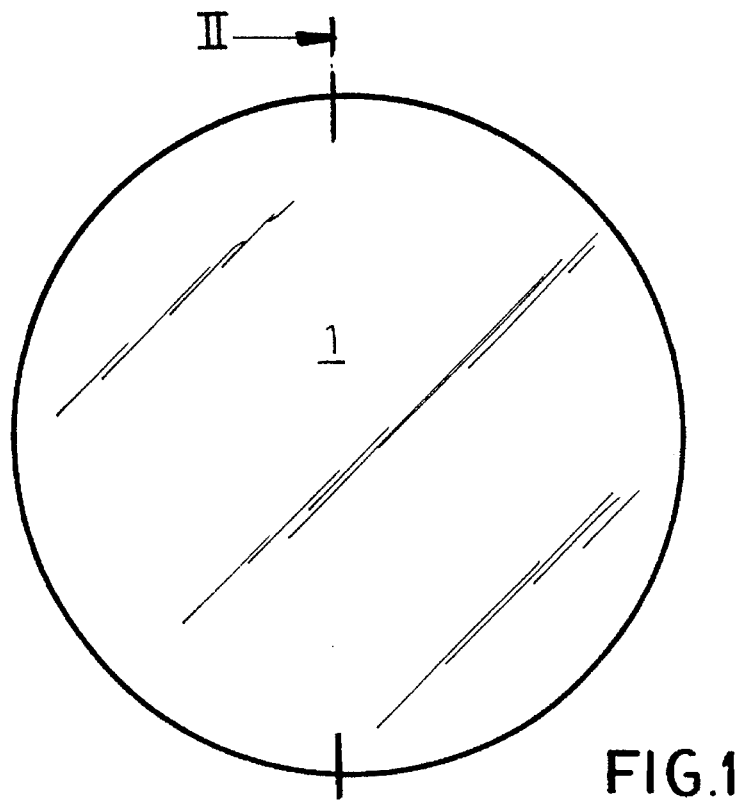
FIG. 1 is a large-scale view of a reactive element according to the invention.
Figure 3:
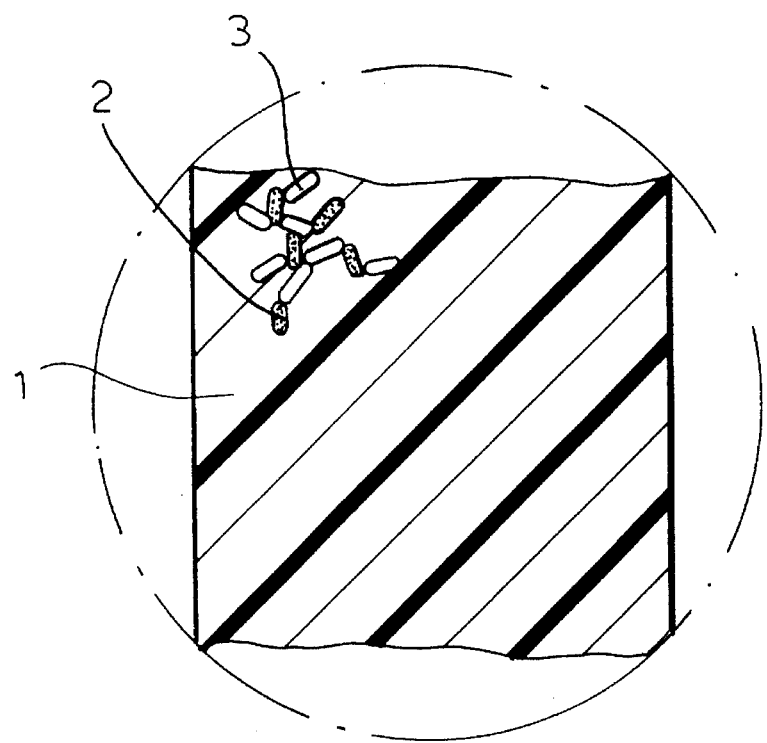
FIG. 3 is a large-scale view of the detail indicated at III in FIG. 2.
Figure 2:
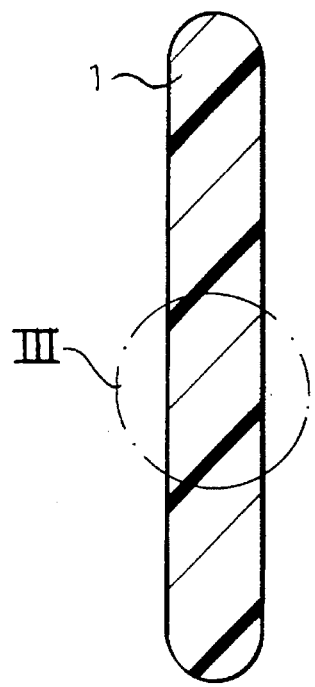
FIG. 2 is a section taken along line II—II of FIG. 1.

As best seen in FIGS. 1 and 2 the element 1 is formed as a tablet-shaped disk. It is comprised as shown in FIG. 3 of a multiplicity of particles 2 of a relatively active metal intermixed with particles 3 of a less active metal in electrical contact with each other and imbedded in a conductive synthetic-resin matrix forming the element 1. The particles can simply be mixed together or can form a eutectic or noneutectic alloy. When alloy particles are used they can be imbedded in a matrix that is dissolved by the acid of the body 12.

We claim:

1. In a lubricant dispenser comprising:

a housing;

a piston subdividing the housing into a pair of compartments one of which is generally closed and the other of which is adapted to be connected to a machine to be lubricated;

a body of a reactive liquid in the one closed compartment;

a body of a fluent lubricant in the other compartment, the piston being movable against the lubricant body to force same from the housing to the machine;

an element in the one compartment capable of reacting with the liquid and forming a gas; and means for immersing the element in the reactive liquid and thereby pushing the piston by means of the gas against the lubricant body and expelling the lubricant from the housing, the improvement wherein the reactive element is constituted as a coherent block by a first multiplicity of particles of an active first substance capable of reacting with the liquid and forming a gas on reaction therewith and a second multiplicity of particles intermixed and in electrically conductive engagement with the reactive particles of a second substance that is less active than the first substance.

2. The improved lubricant dispenser defined in claim 1 wherein the element is formed as a tablet.

3. The improved lubricant dispenser defined in claim 1 wherein the element is cast.

4. The improved lubricant dispenser defined in claim 1 wherein the first and second substances are combined as an alloy in the element.

5. The improved lubricant dispenser defined in claim 1 wherein the first and second multiplicities of particles are sintered together to form the element.

6. The improved lubricant dispenser defined in claim 1 wherein the element has a synthetic-resin matrix in which the first and second multiplicities of particles are imbedded.

7. The improved lubricant dispenser defined in claim 1 wherein the element has a synthetic-resin matrix in which are imbedded bodies each formed as an alloy of the first and second substances.

* * * * *